United States Patent

[11] 3,578,313

[72] Inventor Rolf H. Eppinger
Detroit, Mich.
[21] Appl. No. 801,553
[22] Filed Feb. 24, 1969
[45] Patented May 11, 1971
[73] Assignee Burroughs Corporation
Detroit, Mich.

[54] RECORD CARD HOPPER LOAD-REDUCING DEVICE
3 Claims, 1 Drawing Fig.

[52] U.S. Cl. .......... 271/41, 271/61
[51] Int. Cl. .......... B65h 3/42
[50] Field of Search .......... 271/61, 35, 41, 44, 29, 32; 271/41

[56] References Cited
UNITED STATES PATENTS

| | | | |
|---|---|---|---|
| 1,394,613 | 10/1921 | Drury .......... | 271/41 |
| 1,514,633 | 11/1924 | Schmidt .......... | 271/61 |
| 3,086,772 | 4/1963 | Vogel .......... | 271/35 |
| 3,285,605 | 11/1966 | Vasse .......... | 271/61 |

FOREIGN PATENTS

| | | | |
|---|---|---|---|
| 282,478 | 3/1914 | Germany .......... | 271/61 |

*Primary Examiner*—Joseph Wegbreit
*Attorney*—Paul W. Fish

ABSTRACT: The disclosure embodies a card stack hopper, a card feeder to feed cards singly from the bottom of the stack, and a card baffle which precludes the descent of cards from an upper portion of the stack to a lower portion of the stack until the height of the latter is decreased to a predetermined level.

Patented May 11, 1971 3,578,313
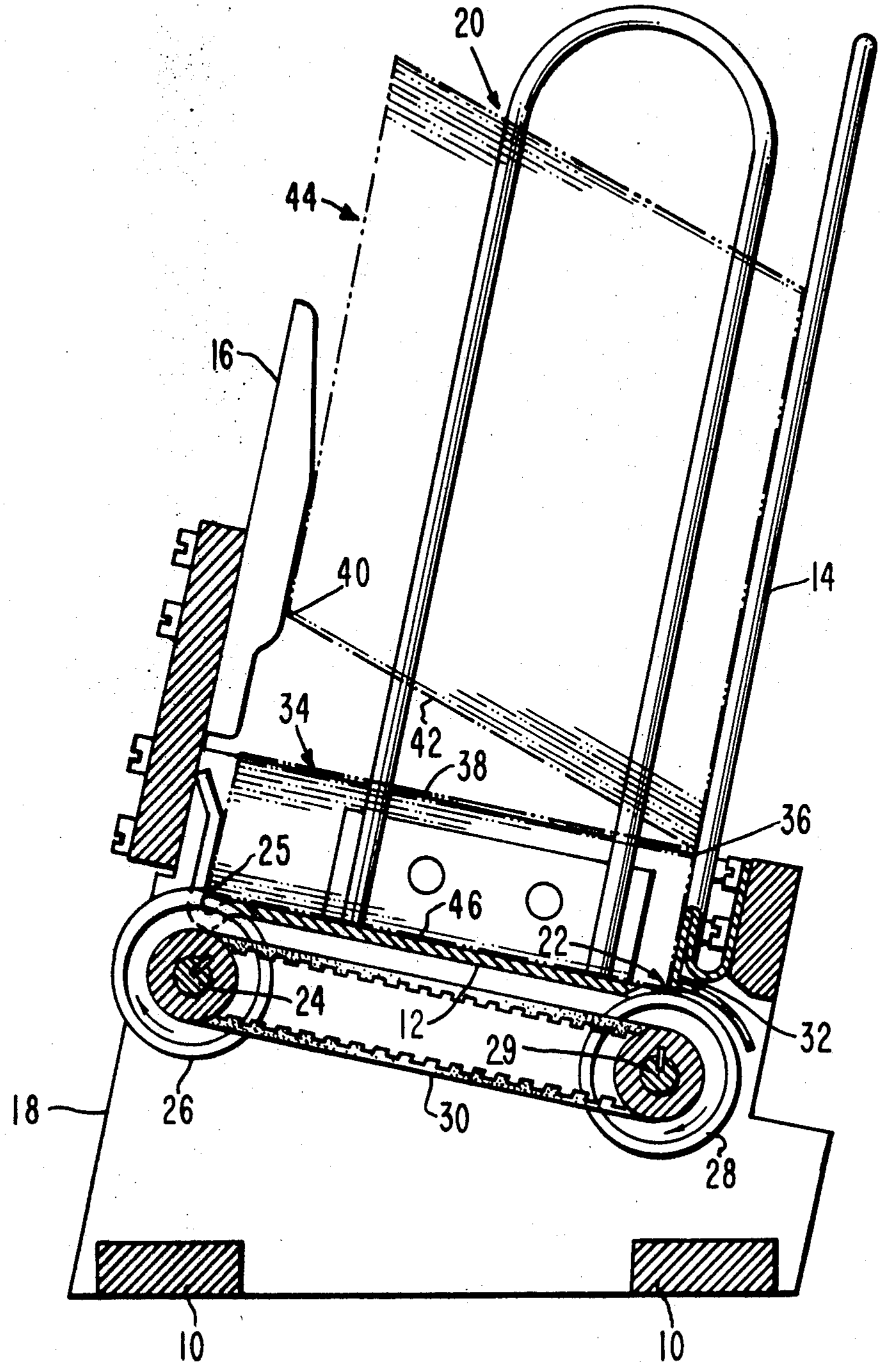
INVENTOR.
ROLF H. EPPINGER.
BY
Wallace P. Lamb
ATTORNEY.

RECORD CARD HOPPER LOAD-REDUCING DEVICE

SUMMARY OF THE INVENTION

The invention resides in the provision of the baffle which maintains the stack weight on the card feeder below that which would deleteriously affect card feeding reliability and distributes a part of the stack weight in such a way as to assist the particular card feeder.

Record card hoppers to be used with picker knife card feeders and the like are limited in capacity by the maximum weight allowed on the bottom card for reliable card feeder operation. Prior art discloses mechanisms developed to support part of the card deck load and meter cards to the feeder in allowable numbers; however, these mechanisms require an external source of power, clutches and sensors, which are expensive both in initial cost and maintenance.

It is the principal object of the invention to provide an improved record card hopper having a load-reducing device requiring no external power and having no sensors or moving parts.

It is another object of the invention to provide a device to reduce a record card hopper load, thereby increasing the allowable hopper capacity for a particular card feed device.

It is another object of the invention to provide a device which will impose a greater downward force on the leading edge of a record card to be fed than on the respective trailing edge thereof to reduce the possibility of a card jam at a feeder throat.

It is yet another object of the invention to provide a device which will facilitate the removal of record cards from a hopper.

In the Drawing

The drawing is a side view of a record card stack hopper embodying features of the invention.

With reference to the drawing, the device includes a supporting means or frame structure 10, a bottom card stack supporting member 12, an upright card stack supporting member 14 and a baffle member 16. The bottom card stack supporting member 12 and the baffle member 16 may be mounted on a pair of upright side frame members 18, of which only one is shown.

The bottom card stack supporting member 12 and the upright card stack supporting member 14 are disposed on the upright side frame member 18 and converge to define a hopper 20 having a downwardly opening throat 22 for the feeding of cards from the bottom of a stack. The baffle member 16 is disposed on the upright side frame member 18 to project into the hopper 20 above the bottom card stack supporting member 12 and spaced from the upright card stack supporting member 14.

A drive shaft 24, which may be rotated by one of many well-known business machine motors, is journaled on the upright side frame members 18 below the trailing edge of the card stack such that a bottom card starter, such as a step 25 on the periphery of a picker roller 26 affixed to the drive shaft 24 extends above the bottom supporting member 12 an amount slightly less than the thickness of a card. Thus, as the picker roller 26 is rotated the step 25 engages the trailing edge of the bottom card 46 and impels it for a short distance in the direction of feed. A friction feeder such as a feed roller 28 is affixed to an idler shaft 29 journaled on the upright side frame member 18 below the throat 22 and is connected to the drive roller 24 by an endless belt 30. To prevent the bottom card 46 from bearing on the periphery of the roller 28 with a great enough force to drive it from the stack, the axis of the idler shaft 29 is positioned slightly beyond the plane of the card-abutting surface of the upright card stack supporting member 14 in the direction of card feed. With the feed roller 28 so disposed the roller does not become effective to drive a card from the stack until the bottom card starter imparts a short motion to the card in the direction of feed, thus positioning the card over the uppermost portion of the roller's periphery. A restricting member 32 is disposed on the upright side frame member 18 to acutely define the throat 22 through which the friction feeder 28 displaces an engaged card.

Operation

With reference to the drawing, record cards are loaded into the hopper 20 at a point above the baffle member or cam 16. Gravity forces the cards past the cam 16 toward the bottom supporting member 12. Since the distance between the cam 16 and the upright supporting member 14 is less than the minor dimension of a record card, the cards are canted as they pass the cam 16. Once past the cam 16, the cards stack parallel to the bottom supporting member 12 to form a lower stack portion 34.

As the cards continue to stack upon the bottom supporting member 12, the height of the lower stack portion 34 eventually becomes such that the distance between the point 36 of intersection of the upright supporting member 14 and the upper leading edge of the top card 38 of the lower stack portion 34 and the nearest point 40 on the cam 16 is less than the minor dimension of a card. The next card 42 will be supported at its trailing edge by the cam 16 at the point 40 and fulcrummed at its leading edge by the lower stack portion 34. The card 42 will also be supported by the frictional force between its leading edge and the upright supporting member 14 at the point 36, this force being a function of the coefficient of friction between the card 42 and the upright supporting member 14 and of the normal force therebetween as imposed by a component of gravitational force so directed by the cam 16. The card 42 and those cards placed into the hopper 20 after it will form an upper stack portion 44 supported as described parallel to the plane through the point 40 on the cam 16 and the point 36 adjacent to the upright supporting member 14 and at an acute angle to the bottom supporting member 12.

The support given the upper stack portion 44 by the cam 16 and by the frictional force between the upper stack portion 44 and the upright supporting member 14 reduces the total weight on the bottom card 46 in the lower stack portion 34 to a value less than that which would deleteriously affect card feeding reliability. That weight of the upper stack portion 44 which is not so supported rests on the lower stack portion 34 at the point 36 adjacent to the upright supporting member 14. This will impose a greater downward force on the leading edge of the next card 46 to be fed than on its trailing edge, thereby reducing the possibility of a card jam at the restricting member 32. Specifically, the downward force on the bottom card presses the leading edge thereof into alignment with the throat 22 and, after the picker roller 26 has imparted a short movement to the card, the downward force insures a firm frictional engagement of the card with the friction feeder 28.

As cards are fed from the bottom of the lower stack portion 34, the height of the lower stack portion 34 decreases. The point 36 of intersection of the upright supporting member 14, the top card 38 of the lower stack portion 34 and the bottom card 42 of the upper stack portion 44 moves along the upright supporting member 14 toward the bottom supporting member 12. The distance between the point 36 and the nearest point 40 on the cam 16 increases until it is greater than the minor dimension of a card, whereupon the bottom card 42 of the upper stack portion 44 will no longer be supported by the cam 16 and will drop to become the top card of the lower stack portion 34.

As cards drop from the upper stack portion 44 to the lower stack portion 34, the point 36 will move back up along the upright supporting member 14 until the distance between the point 36 and the nearest point 40 on the cam 16 is once again less than the minor dimension of a card. The cards in the upper stack portion 44 will again be supported as previously described. As more cards are fed from the bottom of the lower stack portion 34, the point 36 will again move toward the bottom supporting member 12 until cards drop from the upper stack portion 44 to replenish the lower stack portion 34. The height of the lower stack portion 34 is thus maintained relatively constant. When the feeder is turned off, cards from the upper stack portion 44 drop to the lower stack portion 34 until the height of the latter is once again adequate to maintain an equilibrium of forces about the point 36, whereupon all cards will come to rest.

The acute angle formed between the lower stack portion 34 and the upper stack portion 44 facilitates the removal of the latter by providing an opening into which a hand or other suitable device may be inserted to support and lift the upper stack portion 44 from the hopper 20. This may be done whether or not the feeder is operating.

I claim:

1. A card feeder comprising:

a bottom card supporting member having a fixed flat surface acutely inclined with horizontal for upwardly supporting a stack of cards, said flat surface having a substantially horizontal edge forming a downwardly inclined side of said surface, an upright card stack supporting member disposed perpendicularly with said flat surface, said upright supporting member having a linear extremity spaced apart from and disposed substantially parallel with a corresponding horizontal edge of said flat surface to form a narrow, downwardly opening throat therewith, a friction feeder having a card-engaging friction surface disposed slightly below said throat for driving a card therethrough, and a baffle member positioned in opposing relationship to said upright card stack supporting member for blockably restricting the trailing edges of an upper portion of the card stack, the leading edges of the upper portion of the stack being fulcrummed by the leading edges of a lower portion of the stack, so that the weight of the upper stack portion bearing upon the leading edges of the lower stack portion presses the bottom card of the lower stack into said narrow throat and firmly against the friction surface of said feeder.

2. A card feeder as defined in claim 1 wherein the card-engaging friction surface of said friction feeder is characterized by the periphery of a roller, said roller having an axis of rotation disposed at or slightly beyond the plane of said upright card stack supporting member from the horizontal edge of said flat surface so that the periphery of said roller is normally out of firm engagement with the bottom card of the stack.

3. A card feeder as defined in claim 3 wherein said friction feeder additionally comprises a bottom card starter associated with said roller, said bottom card starter being effective for contacting the trailing edge of the bottom card and pushing said card into firm engagement with the periphery of said roller.

PO-1050
(5/69)

UNITED STATES PATENT OFFICE
CERTIFICATE OF CORRECTION

Patent No. 3,578,313 Dated May 11, 1971

Inventor(s) Rolf H. Eppinger

It is certified that error appears in the above-identified patent and that said Letters Patent are hereby corrected as shown below:

Col. 4, line 19, change "defined in claim 3" to read as --defined in claim 2--.

Signed and sealed this 24th day of August 1971.

(SEAL)
Attest:

EDWARD M.FLETCHER,JR.
Attesting Officer

WILLIAM E. SCHUYLER, JR.
Commissioner of Patents